US012562040B2

(12) United States Patent
Singh

(10) Patent No.: US 12,562,040 B2
(45) Date of Patent: Feb. 24, 2026

(54) SYSTEM AND METHOD TO DETECT DEVICE DURING AMBIENT SENSORS

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 186 days.

(21) Appl. No.: 18/477,637

(22) Filed: Sep. 29, 2023

(65) Prior Publication Data

US 2025/0111762 A1 Apr. 3, 2025

(51) Int. Cl.
| | |
|---|---|
| *G08B 13/16* | (2006.01) |
| *G06N 20/00* | (2019.01) |
| *G06Q 30/016* | (2023.01) |
| *G08B 13/189* | (2006.01) |

(52) U.S. Cl.
CPC ......... *G08B 13/1672* (2013.01); *G06N 20/00* (2019.01); *G06Q 30/016* (2013.01); *G08B 13/1895* (2013.01)

(58) Field of Classification Search
CPC ............ G08B 13/1672; G08B 13/1895; G06N 20/00; G06Q 30/016; G06Q 10/0832
See application file for complete search history.

(56) References Cited

U.S. PATENT DOCUMENTS

| | | | | |
|---|---|---|---|---|
| 11,232,390 | B1 * | 1/2022 | Leung | ................ G06K 19/0723 |
| 11,315,397 | B2 | 4/2022 | Bella et al. | |

| | | | |
|---|---|---|---|
| 2009/0134999 | A1 | 5/2009 | Dobson et al. |
| 2010/0241467 | A1 | 9/2010 | Saw et al. |
| 2010/0328147 | A1 | 12/2010 | Daems et al. |
| 2011/0018707 | A1 | 1/2011 | Dobson et al. |
| 2011/0203003 | A1 | 8/2011 | Peeters et al. |
| 2013/0173316 | A1 | 7/2013 | Agrawal |
| 2014/0074746 | A1 | 3/2014 | Wang |
| 2014/0358777 | A1 | 12/2014 | Gueh |
| 2015/0221160 | A1 | 8/2015 | Graef et al. |
| 2017/0178415 | A1 | 6/2017 | Peeters et al. |
| 2018/0253956 | A1 * | 9/2018 | Nygren ................... G01P 15/18 |
| 2018/0357603 | A1 * | 12/2018 | Wilkinson ............... G07C 5/02 |

(Continued)

FOREIGN PATENT DOCUMENTS

| | | | | |
|---|---|---|---|---|
| BR | 102019013991 A2 * | 1/2021 | ............. | G06K 17/00 |

OTHER PUBLICATIONS

Shailendra Singh, et al.; "Altering card device attributes in response to detecting an anomalous location of the card device;" U.S. Appl. No. 18/188,877, filed Mar. 23, 2023.

(Continued)

*Primary Examiner* — Rufus C Point

(57) ABSTRACT

A system for detecting tampering of an item during transit from a source to a destination. The system includes a processor which receives a plurality of measurements of the environment surrounding the item during transit and detects at least one anomaly in the plurality of measurements. When the at least one anomaly is detected, it is compared with the expected measurement at the location and/or time and if the comparison shows a degree of difference that is greater than a predetermined threshold that indicates the item may have been tampered with during transit, the system and method performs an action to disable the item.

20 Claims, 3 Drawing Sheets

(56) References Cited

U.S. PATENT DOCUMENTS

| 2020/0184296 | A1  | 6/2020  | Oliver       |           |
|--------------|-----|---------|--------------|-----------|
| 2020/0250611 | A1* | 8/2020  | Pourteymour  | G06F 9/542 |
| 2021/0216963 | A1  | 7/2021  | Sharma et al. |          |
| 2022/0122436 | A1* | 4/2022  | Volkerink    | G06V 20/10 |
| 2022/0215429 | A1  | 7/2022  | Heeter       |           |
| 2023/0366255 | A1* | 11/2023 | Farra        | E05G 1/10 |

OTHER PUBLICATIONS

Shailendra Singh, et al.: "Altering card device attributes in response to detecting a proximity intrusion;" U.S. Appl. No. 18/188,898, filed Mar. 23, 2023.

* cited by examiner

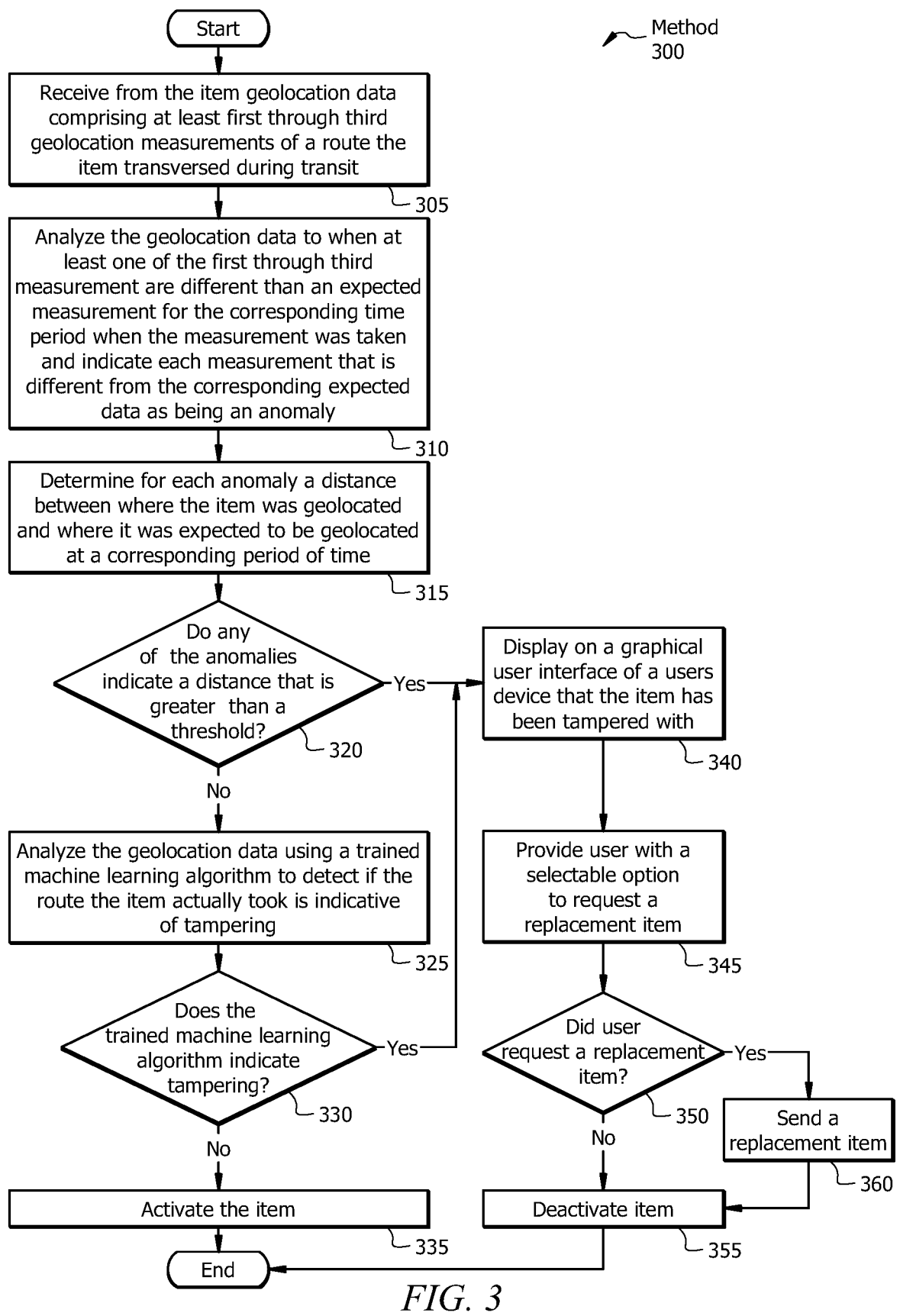

Method
300

Start

Receive from the item geolocation data comprising at least first through third geolocation measurements of a route the item transversed during transit
305

Analyze the geolocation data to when at least one of the first through third measurement are different than an expected measurement for the corresponding time period when the measurement was taken and indicate each measurement that is different from the corresponding expected data as being an anomaly
310

Determine for each anomaly a distance between where the item was geolocated and where it was expected to be geolocated at a corresponding period of time
315

Do any of the anomalies indicate a distance that is greater than a threshold?
320

Yes

No

Display on a graphical user interface of a users device that the item has been tampered with
340

Analyze the geolocation data using a trained machine learning algorithm to detect if the route the item actually took is indicative of tampering
325

Provide user with a selectable option to request a replacement item
345

Does the trained machine learning algorithm indicate tampering?
330

Yes

No

Did user request a replacement item?
350

Yes

No

Send a replacement item
360

Activate the item
335

Deactivate item
355

End

FIG. 3

SYSTEM AND METHOD TO DETECT DEVICE DURING AMBIENT SENSORS

TECHNICAL FIELD

The present disclosure relates generally to computational systems, and more specifically to a system and method to detect device tampering during transit using ambient sensors.

BACKGROUND

Items are often shipped from a source such as a manufacturer to a destination such as the end user(s), using third party couriers. However, when an item is valuable or allows for access to valuable information or resources, attempts may be made to tamper with the item during shipping. When an item is tampered with, the end users at the destination may have no way of knowing the item has been tampered with. Further, if the item allows for access to sensitive resources, more sophisticated methods of tampering with the item may be used and be less easily detected by the end user. The existing approaches to identify when tampering has occurred during transit from a source to the destination either require skills that not all end users can be expected to have and/or are simply ineffective.

SUMMARY

The system and method disclosed in the present application provides a technical solution to the technical problems discussed above by providing the capability to determine if an item has been tampered with during transit. The system and method utilize various sensors such as, but not limited to, ambient light, ambient sound, and geolocation sensors to determine when the item may have been tampered with by detecting anomalies that indicate that item has been transported to an unexpected location and/or the packaging the item is in, had been unexpectedly opened. Either when the item is received at a destination by an end user or during transit, the item transmits sensor and/or geolocation data to the system which receives the data and analyzes it. If anomalies are detected that meet predetermined criteria indicating that the item has been tampered with, then the system invalidates and/or deactivates the item. If, instead, the data from the item does not indicate that tampering has occurred, the system may then validate and/or activate the item. By using this system and method for determining if an item has been tampered with during transit, the end user and/or producer may be made more confident that the item has not been tampered with during transit and/or may more easily request that a replacement item be sent when tampering is suspected.

The disclosed system provides several practical applications which include: (a) a system that verifies that an item has not been tampered with during transit, that requires little or no interaction by an end user; (b) a system to detect possible tampering that is difficult for bad actors to overcome; and (c) a system for detecting possible tampering that has less false positives then other methods. This approach provides for better vigilance and accuracy in detecting tampering compared to existing approaches. By determining that tampering has occurred and thereby invalidating and/or deactivating the item in a proactive manner, the system and method of the present disclosure saves valuable computer, memory, and networking resources that would otherwise be spent using the tampered item, determining later that the item had been tampered with, and then subsequently trying to deactivate the item.

In one embodiment, the disclosed system detects tampering of an item during transit from a source to a destination. The system includes a memory configured to store ambient sensor data associated with the item, wherein the stored ambient sensor data includes a first expected measurement associated with the item at a first timestamp, a second expected measurement associated with the item at a second timestamp, and a third expected measurement associated with the item at a third timestamp. The system also includes a processor operably coupled to the memory that receives from the item, ambient sensor data, wherein the ambient sensor data includes a first measurement of an environment surrounding the item at the first timestamp, a second measurement of the environment surrounding the item at the second timestamp, and a third measurement of the environment surrounding the item at the third timestamp. The first measurement, the second measurement, and the third measurement measure at least one of an amount of light in the environment surrounding the item or an amount of sound in the environment surrounding the item. The processor then detects at least one anomaly in the ambient sensor data, wherein the at least one anomaly occurs when the first measurement is different from the first expected measurement at the first timestamp, the second measurement is different from the second expected measurement at the second timestamp, or the third measurement is different from the third expected measurement at the third timestamp. Once at least one anomaly is detected, the processor determines a degree of difference between any of the first measurement and the first expected measurement, the second measurement and the second expected measurement, and the third measurement and the third expected measurements. If the degree of difference is greater that a predetermine threshold, indicating that the item has been tampered with in transit from the source to the destination, the processor then performs an action to disable the item.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates one embodiment of a method of detecting tampering of an item during transit using geolocation.

DETAILED DESCRIPTION

System Configured to Detect Tampering of an Item During Transit, Overview

Figure 1:
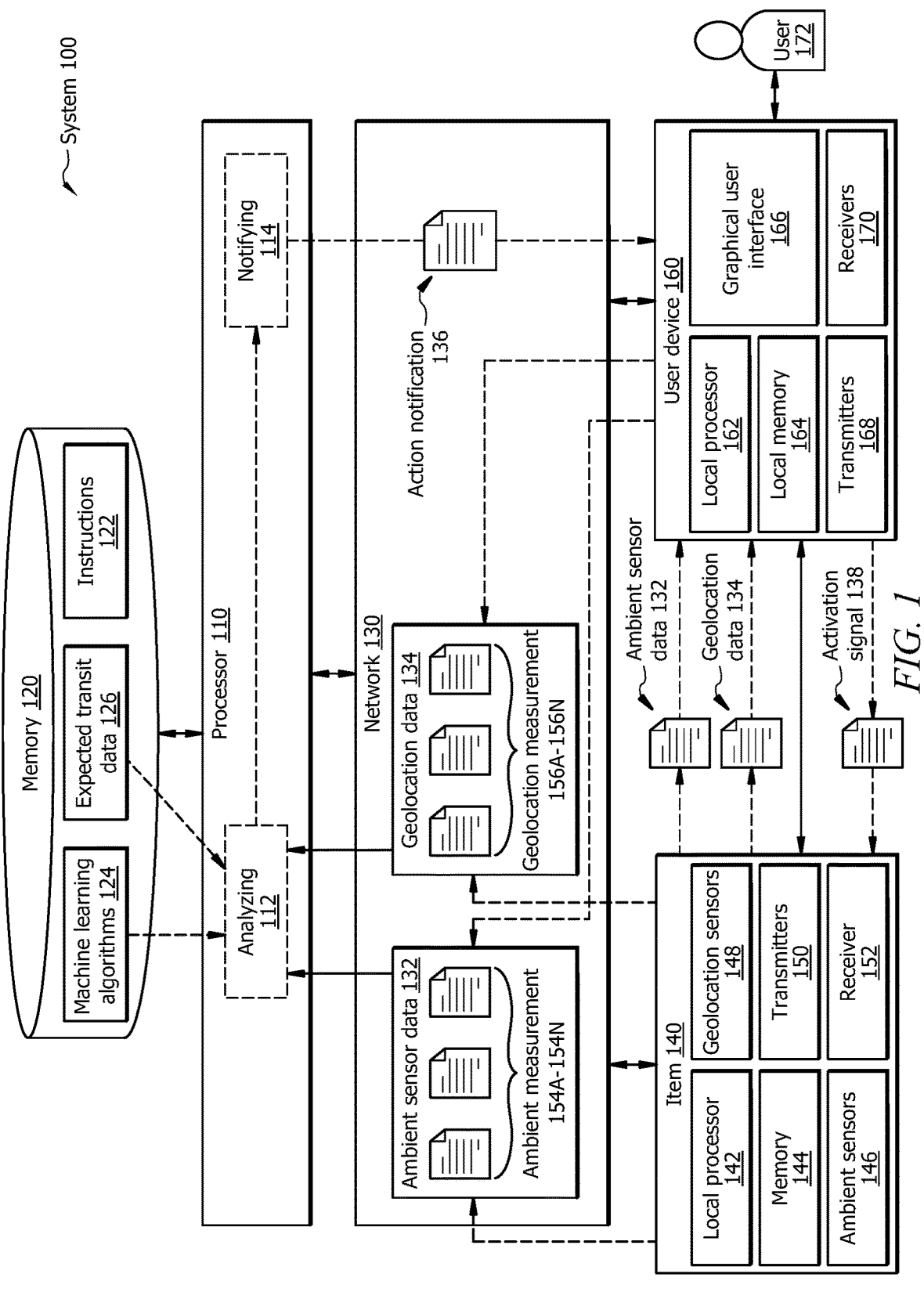
FIG. 1 illustrates one embodiment of a system configured to detect tampering of an item during transit.

FIG. 1 is a schematic diagram of a system 100 configured to determine whether to validate and/or activate an item 140 that has traversed a route during transit from a source such as a manufacturer (not shown) to a destination (not shown)

which may include a user device 160. More specifically, the system 100 is configured to determine, using ambient sensors 146 and/or geolocation sensors 148, when the item 140 has been tampered with during transit. The item 140 communicates through a network 130 with a processor 110 that performs an analyzing operation 112 on the ambient sensor data 132 and geolocation data 134 received from the item 140. The ambient sensor data 132 includes at least three measurement 154A-154N and the geolocation data 134 includes at least three measurements 156A-156N. The processor 110, analyzes the ambient sensor data 132 and geolocation data 134 using the analyzing operation 112 and based on the results of the analyzing operation 112 performs a notifying operation 114 to send an action notification 136 to the user device 160 and/or item 140. The action notification 136 indicates whether the item 140 may be de-activated or activated depending on if tampering has been determined by the processor 110 performing the analyzing operation 112. The user device 160 then sends an activation signal 138 to the item 140 to activate or de-activate the item 140. Additionally, the user device 160 provides a graphical user interface (GUI) 166 that allows a user 172 to order a replacement item 140 when the processor 110 determines that the item 140 may have been tampered with.

In one embodiment, the system 100 comprises a processor 110 and a memory 120 that are in signal communication with the item 140 and a user device 160. At least the processor 110, item 140, and user devices 160 are connected through a network 130. The system 100 may be configured as shown or in any other suitable configuration and may include more or less components then are shown in FIG. 1.
Network The network 130 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 130 may be configured to support any suitable type of communication protocol as would be appreciated by one of ordinary skill in the art.
Item The item 140 may include any item 140 that needs to be shipped or transported from a first location (not shown) to a second location (not shown). The item 140 as shown in FIG. 1, includes a local processor 142, a memory 144, ambient sensors 146, geolocation sensors 148 transmitters 150, and a receiver 152. The item 140 may include more less parts then shown in FIG. 1.

Examples of the item 140 may include, but are not limited to, computers, laptops, mobile devices (e.g., smart phones or tablets), credit or debit cards, or any other suitable type of device that may shipped from a first location such as a manufacture (not shown) to a user 172, and that may be activated or deactivated by a user device 160 or other device through the network 130. The item 140 includes at least one local processor 142 that performs one or more processes or operations, including but not limited to collecting ambient sensor data 132 and/or geolocation data 134 from ambient sensors 146 and geolocation sensors 148 and sending the ambient sensor data 132 and geolocation data 134 through one or more transmitters 150 to a user device 160 or through the network to a processor 110. The local processor 142 may also receive an activation signal 138 from the user device 160 and/or the processor 110 through a receiver 152. While a single item 140 is shown, a plurality of items 140, may be present with one item 140 being shown in FIG. 1, for simplicity. In an example where the item 140 is a credit or debit card, the system and method of the present disclosure saves valuable computer, memory, and networking resources that would otherwise be spent processing fraudulent transactions, determining later that the credit or debit card had been tampered with, and then subsequently trying to deactivate the credit or debit card. In addition, valuable computer, memory, and networking resources would also need to be spent attempting to investigation and reverse any fraudulent transactions. By proactively identifying a credit or debit card that has been tampered with, those cards can be deactivated and new cards can be issued before any fraudulent transactions can take place, thereby saving these valuable resources.

The item 140 may also include at least one local memory 144 for storing instructions as well as any data collected from the ambient sensors 146 and geolocation sensors 148. While FIG. 1 only shows the item 140 including a single local processor 142 and a single local memory 144, they may include any suitable number and combination of local processors 142 and local memories 144 as well as any other components; with only one local processor e.g., 142 and one local memory e.g., 144 for the item 140 being shown in FIG. 1 for simplicity.

The item 140 is configured to collect ambient sensor data 132 and/or geolocation data 134 during transit. The item 140 is configured to perform other actions in addition to collecting ambient sensor data 132 and/or geolocation data 134 once it is activated. These additional actions are beyond the scope of this disclosure and depend on the specific configuration and use of the item 140.

The item 140 includes ambient sensors 146 and geolocation sensors 148. The item 140 may include additional sensors or just one of the ambient sensors 146 or the geolocation sensors 148, depending on how the item 140 is configured and what data is being used by the processor 110 to determine if the item 140 has been tampered with. The ambient sensors 146 may take the form of light detectors or noise detectors, such as, but not limited to photodiodes, cameras, microphones, and/or piezoelectric sensors, as well as any other kind of sensor that measures the ambient environment. The geolocation sensors may take the form of any type of geolocation sensors such as GPS or similar receivers, accelerometers, cellular triangulation, or any other useful form.

The item 140 may include transmitters 150 and receivers 152 that allow it to communicate the ambient sensor data 132 and geolocation data 134 with either or both the network 130 and user device 160. These transmitters 150 may take the form of cellular, WIFI, Bluetooth, near field, or other types of transmitters or transceivers. In one embodiment the item 140 collects the ambient sensor data 132 and/or geolocation data 134 during transit. The ambient sensor data 132 and/or geolocation data 134 may be collected at least three separate times or may be collected periodically at predetermined intervals throughout the transit, for example every five minutes, ten minutes, thirty minutes, hour, twelve hours, etc. The ambient sensor data 132 and/or geolocation data 134 is either stored in the local memory 144 associated with the item 140, along with timestamps indicating when the data was collected. Alternatively, or additionally, the ambient sensor data 132 and/or geolocation data 134 is transmitted using the transmitters 150 to the processor 110 through the network 130 for immediate or later analyzing.

When the item 140 is brought in range of the user device 160, the user device 160 transmits a signal from the transmitter 168 which causes the item 140 to transmit the ambient sensor data 132 and/or geolocation data 134 to the user device 160 which then forwards that data through the network 130 to the processor 110. Alternatively, or additionally, the item 140 continuously or periodically transmits the ambient sensor data 132 and/or geolocation data 134 during transit using a wireless network 130 using the transmitters 150. The item 140 may additional include an eSIM (not shown) or other components that allow the item 140 to communicated with the network 130 and/or to the user device 160.

User Device

Examples of the user device 160 may include, but are not limited to, computers, laptops, mobile devices (e.g., smart phones or tablets), automated teller machines (ATMs), kiosks, or any other suitable type of device that may allow a user 172 to activate the item 140 and/or order a replacement item 140. The user device 160 may be associated with one or more users 172, or may be a shared device such as a kiosks or ATM. The user device 160 includes at least one local processor 162 that performs one or more processes or operations, including but not limited to activating the item 140. The user device 160 also includes transmitters 168 and receivers 170 for communicating with the item 140 and/or the network 130. Alternatively, the transmitters 168 and receivers 170 may take the form of one or more transceivers. The user device 160 also includes a graphical user interface (GUI) 166 which allows a user 172 to interact with the user device 160 and/or perform actions related to the item 140 and/or processor 110.

The user device 160 may also include at least one memory 164 for storing instructions as well as any data related to either the item 140 or other processes performed by the user device 160. The memory causes the local processor 162 to collect ambient sensor data 132 and/or geolocation data 134 from the item 140 and forward it through the network 130 to the processor 110. The local processor 162 then receives an action notification 136 from the processor 110. As a result, the local processor 162 may cause the transmitters 168 to send an activation signal 138 to the item 140 which either activates it or deactivates it depending on the determination made by the processor 110 and sent in the action notification 136. If the action notification 136 is that the item 140 may have been tampered with and may be deactivated, the processor 110 causes the GUI 166 to display a notification that the item 140 has been tampered with and to provide a user 172 with the ability to order a replacement item 140 or to perform some other action.

Processor

The processor 110 receives and/or processes the ambient sensor data 132 and/or geolocation data 134 received either from the item 140 or through the user device 160. The processor 110 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 110 may be a programmable logic device, a microcontroller, a microprocessor, or any suitable combination of the preceding. The processor 110 is communicatively coupled to and in signal communication with the memory 120. The one or more processors making up the processor 110 are configured to process data and may be implemented in hardware or software. For example, the processor 110 may be 8-bit, 16-bit, 32-bit, 64-bit or of any other suitable architecture. The processor 110 may include an arithmetic logic unit (ALU) for performing arithmetic and logic operations, processor registers that supply operands to the ALU and store the results of ALU operations, and a control unit that fetches instructions 122 from memory 120 and executes them by directing the coordinated operations of the ALU, registers and other components.

The processor 110 is in operative communication with the memory 120. The processor 110 is configured to implement various instructions 122 stored in the memory 120. The processor 110 may be a special purpose computer designed to implement the instructions 122 and/or functions disclosed herein. For example, the processor 110 may be configured to perform the operations of the methods described in FIGS. 2 and 3.

Additionally, the processor 110 executes instructions 122 to perform a series of one or more operations such as, but not limited to, an analyzing operation 112 and a notifying operation 114 which are described in more detail below with regards to the method of FIGS. 2 and 3. The processor 110 receives the ambient sensor data 132 and geolocation data 134 from the item 140 and/or user device 160 through the network. The processor 110 then performs the analyzing operation 112 on the ambient sensor data 132 and/or geolocation data 134. As will be described in more detail below with regards to the methods descried in FIGS. 2 and 3, this involves comparing the ambient sensor data 132 and/or geolocation data 134 to expected transit data 126 stored in the memory 120. The analyzing operation 112 may also use one or more machine learning algorithms 124 to determine when ambient sensor data 132 and geolocation data 134 indicates that tampering of the item 140 may have occurred.

Once the processor 110 performs the analyzing operation 112, the processor 110 performs the notifying operation 114. The notifying operation 114, sends an action notification 136 to the user device 160 and/or the item 140. This action notification 136 indicates if the item 140 is suspected of having been tampered with and/or an instruction for the user device 160 to deactivate the item 140 through the activation signal 138. Alternatively, the action notification 136 may indicate that the user device 160 may activate the item 140 and/or use the item 140 through the activation signal 138. The notifying operation 114 may perform other actions such as allowing the re-ordering of the item 140 when a user 172 using the GUI 166 requests that a replacement item 140 be shipped.

The processor 110 may perform more or less operations than shown in FIG. 1, and the specific operations shown are only examples. While a single processor 110 is shown, the processor 110 may include a plurality of processors or computational devices. The operations described herein as being performed by the processor 110 may be performed by a separate processor or software application executed on a single computational device e.g., processor 110, or they may be located on separate servers and/or even separate datacenters such as a cloud server and/or the item 140.

Memory

Memory 120 may be any type of storage for storing a computer program comprising instructions 122, machine learning algorithms 124, and expected transit data 126. The memory 120 may be a non-transitory computer-readable medium that is in operative communication with the processor 110. The memory 120 may be one or more disks, tape drives, or solid-state drives. Alternatively, or in addition, the memory 120 may consist of one or more cloud storage devices. The memory 120 may also be used as an over-flow data storage device, to store applications when such applications are selected for execution, and to store instructions 122 and data that are read during the execution of the applications. The memory 120 may be volatile or non-volatile and may comprise read-only memory (ROM), random-access memory (RAM), ternary content-addressable memory (TCAM), dynamic random-access memory (DRAM), and static random-access memory (SRAM).

Figure 2:
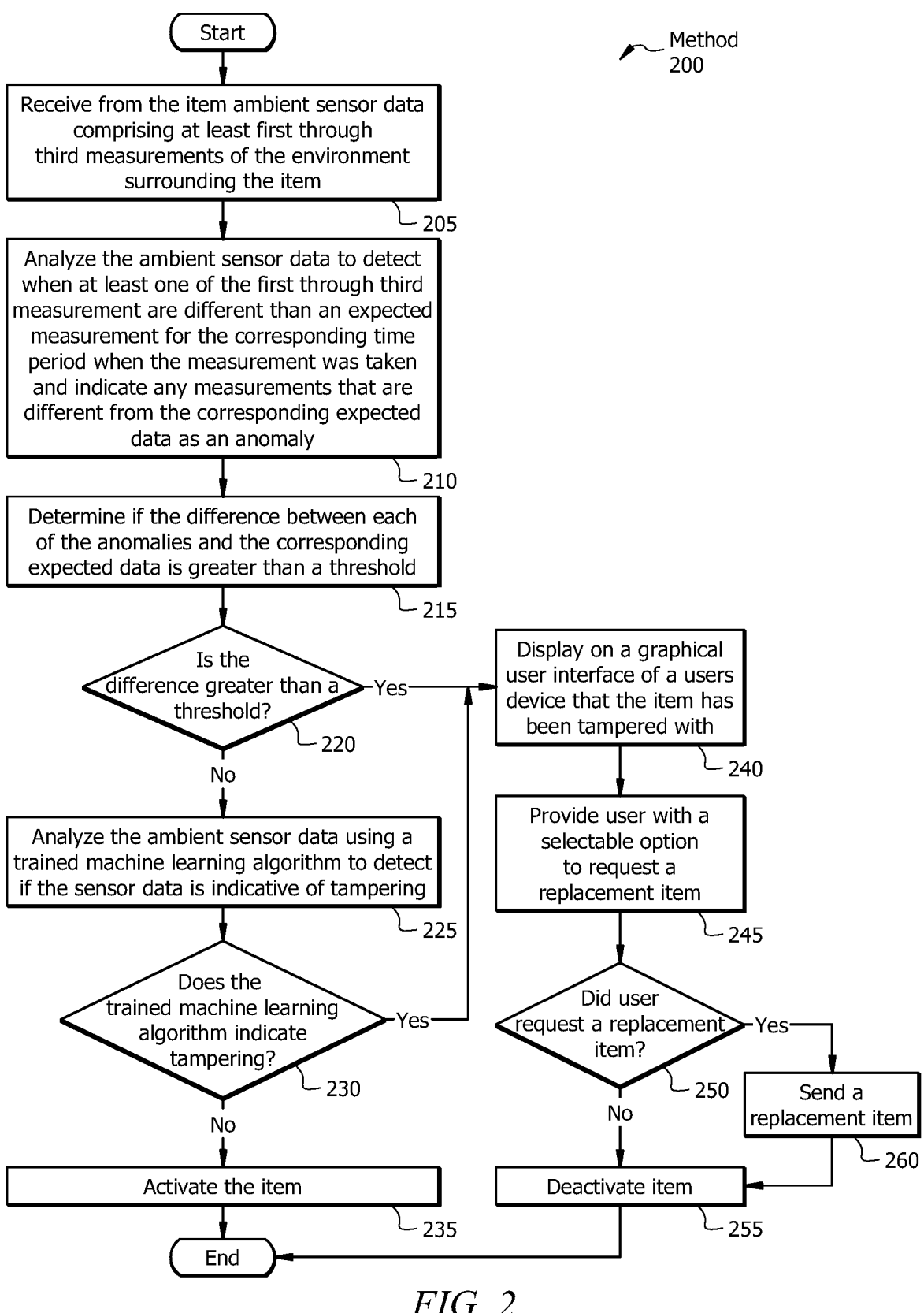
FIG. 2 illustrates one embodiment of a method of detecting tampering of an item during transit using ambient sensors.

The memory 120 stores instructions 122 that when executed by the processor 110, causes the processor 110 to perform the operations that are described in FIGS. 2 and 3. The instructions 122 may comprise any suitable set of instructions, logic, rules, or code. The memory 120 may also include storage that takes the form of a database for storing expected transit data 126. The expected transit data 126 may be used by the processor 110 when performing the analyzing operation 112 as well as when training and/or using one or more machine learning algorithms 124. The expected transit data 126 may be stored and recalled using known protocols such as SQL, XML, and/or any other protocol or language that a user 172, administrator, or developer of the system 100 wishes to use.

The machine learning algorithms 124 may take many forms including naïve bayes, linear regression, decision trees, and neural network algorithm such as a feedforward neural network, autoencoder, probabilistic neural network (PNN), convolutional neural network (CNN), or other known machine learning algorithms 124. The specific type of machine learning algorithm 124 stored in the memory 120 and used by the processor 110 may be selected based on a variety of factors, including computational ability of the processor 110, speed of the machine learning algorithm 124, availably of sufficient training data for the specific machine learning algorithm 124, and appropriateness to the specific ambient sensor data 132 and geolocation data 134. The machine learning algorithm 124 may be trained based on feedback from the user 172 or other users/administrators each time a new item 140 is analyzed using the analyzing operation 112.

Tampering Detection Process Using Ambient Sensors

FIG. 2 is a flowchart of an embodiment of a method 200 for detecting tampering of the item 140 through the use of one or more ambient sensors 146. The processor 110 may execute instructions 122 stored in the memory 120, that employ the method 200 for detecting tampering and determining whether to have the user device 160 activate or deactivate the item 140 based on received ambient sensor data 132. Method 200 may be performed by itself or in combination with method 300 described below with regards to FIG. 3.

At operation 205, the processor 110 receives from the item 140 ambient sensor data 132 associated with the item 140 and collected from the ambient sensors 146. The ambient sensor data 132 comprises of at least first through third ambient measurements 154A-154N of the environment surrounding the item 140 along with appropriate time stamps to indicate when the measurements were made. At least three ambient measurements 154A-154N are made, however, while measurements are described as being made only three times during transit, additional measurements may be made and recorded along with their subsequent timestamps. The ambient measurements 154A-154N may be made periodically based on a predetermined schedule such as, but not limited to, every minute, every ten minutes, every hour, once per day, or any other schedule. More or less ambient sensor data 132 may be collected without departing from the present disclosure.

The ambient sensor data may take the form of ambient measurements 154A-154N of the environment associated with the item 140 and/or surrounding the item 140 or packaging (not shown) containing the item 140 for transit, such as but not limited to a box, container, or envelope. The ambient measurements 154A-154N may be of the level of light in the ambient environment, level of noise or sound in the ambient environment, or any other useful measurement of the environment, such as but not limited to, radiation, electromagnetic fields, or other characteristics of the environment that are useful for determining if the item 140 is being tampered with and/or unexpectedly removed from its packaging.

Once the ambient sensor data 132 is received from the item 140, the method proceeds to operation 210. In operation 210, the ambient sensor data 132 received in operation 205, is analyzed by the processor 110 performing the analyzing operation 112. The processor 110 analyzes the ambient sensor data 132 to detect when at least one of a first through third ambient measurements 154A-154N is different from an expected measurement, retrieved from the memory 120, for the same time period. The expected measurement is stored in the memory 120 in the expected transit data 126. The ambient measurements e.g., 154N that are different then the corresponding expected transit data 126 is indicated as an anomaly. Alternatively, one or more ambient measurements e.g., 154N in the ambient sensor data 132 may be indicated as an anomaly when it is outside of a predetermined range of the expected transit data 126.

The expected measurements stored in the expected transit data 126 are determined based on the time stamp stored as part of each of the ambient measurements 154A-154N making up the ambient sensor data 132. The expected measurements in the expected transit data 126 may be determined based on data provided from the courier service transporting the item 140. Alternatively, or additional the expected transit data 126 may be determined by the processor 110 or another device using public data or data provided by a user or administrator or even as determined by a machine learning model of the transit path.

In operation 215, the processor 110 performing the analyzing operation 112, in response to detecting the at least one anomaly, determines the degree of difference between each of the anomalies and the corresponding expected measurements stored in the expected transit data 126. The degree of difference is then compared with a predetermined threshold. The predetermined threshold is specific to the type of ambient sensor data 132, for example when the ambient sensor data is related to light, the predetermined threshold may be a percentage increase in or set amount of detected lux. While if the ambient sensor data is related to sound, it might be a specific number of decibels or a percent increase in detected decibels or other measurement of sound. The predetermined threshold may be determined by a user 172, administrator, developer, or other concerned party and/or may be automatically determined based on the expected path an item 140 is expected to traverse. Alternatively, or additionally, the predetermined threshold may be determined using machine learning or any other tool that may automatically set a predetermined threshold.

As an example, in a non-limiting example, suppose an item 140 is being transported in a sealed container, where the expected level of light is low and is expected to remain at or about the same low level. If during the transit an ambient measurement e.g., 154N of the light level is greater than 100 lux this might indicate that the package was opened, indicating tampering. In another example suppose the item 140 is expected to be on a plane in the cargo hold, and an ambient measurement e.g., 154N of sound is made. If a fifty percent drop in sound is recorded, this may indicate that the item was unexpectedly removed from the cargo hold. Other thresholds and percentages may be used depending on the type of ambient measurement 154A-154N and the expected measurements for the method of transporting the item 140 as well as expected environmental conditions, and the disclosure is not limited by the previous examples.

Once the difference is determined in operation 215, the method proceeds to operation 220 where it is compared with the predetermined threshold, if the difference is greater than the predetermined threshold then the method proceeds to operation 240, otherwise it proceeds to operation 225.

At operation 225 the processor 110, analyzes the ambient sensor data 132 using a trained machine learning algorithm 124. Operation 225 may be performed prior to operation 220 or may be performed instead of operations 215 and 220. Alternatively, operation 225 may not be performed and the method may then proceed straight to operation 235.

The machine learning algorithms 124 may take many forms including naïve bayes, linear regression, decision trees, and neural network algorithm such as a feedforward neural network, autoencoder, probabilistic neural network (PNN), convolutional neural network (CNN), or other known machine learning algorithms 124. The specific type of machine learning algorithm 124 stored in the memory 120 and used by the processor 110 may be selected based on a variety of factors, including computational ability of the processor 110, speed of the machine learning algorithm 124, availably of sufficient training data for the specific machine learning algorithm 124, and appropriateness to the specific ambient sensor data 132 and/or geolocation data 134 (depending on the embodiment being implemented). The machine learning algorithm 124 may be trained based on feedback from the user 172 or other users/administrators each time a new item 140 is analyzed using the analyzing operation 112.

The ambient sensor data 132 is analyzed by the processor 110 performing the analyzing operation 112 using the machine learning algorithm 124. The processor 110 determines if the ambient sensor data 132 as whole or as a part indicates possible tampering based on previously detected patterns in training data or previous performances of the analyzing operation 112 by the processor 110. The results are also used to retrain the machine learning algorithm 124 to make it better at detecting potential tampering.

Once the processor 110, using the machine learning algorithm 124 while performing the analyzing operation 112, analyzes the ambient sensor data 132 in operation 225 the method proceeds to operation 230 where the processor 110 determines if the machine learning algorithm indicates tampering. If both operations 220 and 230 are yes (meaning tampering was not detected) the method proceeds to operation 235 where the item is activated. In operation 235 the processor 110 performing the notifying operation 114, sends an action notification 136 to the user device 160 indicating that an activation signal 138 may be sent to the item 140. After this or alternatively where the item is already activated, the method ends.

Returning to operation 220 or operation 230, if the difference is greater than a threshold and/or the trained machine learning algorithm indicates tampering the method proceeds to operation 240. In operation 240, the processor 110 performs the notifying operation 114, and sends an action notification 136 indicating that the item 140 may be de-activated and has been tampered with. When the user device 160 receives this action notification 136 signal it is caused to display on a graphical user interface (GUI) 166 that the item has been tampered with. The method in operation 245 has the GUI 166 provide the user 172 a selectable option to request a preplacement item. If the user choses to request a replacement item in operation 250 the method proceeds to operation 260, and the processor 110 or other pertinent device causes a replacement item 140 to be sent.

Once the user either indicates a request for a replacement item in operation 250 and a replacement item is sent, or the user does not request a replacement item in operation 250 the method proceeds to operation 255. Alternatively, where the user device 160 does not include a GUI 166, the method may proceed from operations 220 and 230 to operation 255.

In operation 255, the item is then deactivated or disabled. This may be by sending an activation signal from the user device 160 to the item 140 that indicates that the item 140 should be disabled or deactivated. Once the item 140 receives the activation signal 138 indicating it should be deactivated, the item 140 is then disabled. If the item arrives deactivated, operation 260 may be omitted, and the method ends. Alternatively, the processor 110 will cause the item 140 to no longer worked by blocking it on the network 130 or from interacting with the processor 110 or another related networked device (not shown). Once either operation 235 or operation 255 is performed the method 200 of FIG. 2 ends.

Tampering Detection Process Using Geolocation Sensors

FIG. 3 is a flowchart of an embodiment of a method 300 for detecting tampering of the item 140 through the use of one or more geolocation sensors 148. The processor 110 may execute instructions 122 stored in the memory 120, that employ the method 300 for detecting tampering and determining whether to have the user device 160 activate or deactivate the item 140 based on received geolocation data 134. Method 300 may be performed by itself or in combination with method 200 described above with regards to FIG. 2.

At operation 305, the processor 110 receives from the item 140 geolocation data 134 associated with the item 140 and collected from the geolocation sensors 148. The geolocation data 134 comprises of at least first through third geolocation measurements 156A-156N of the geolocation or location of the item 140 along with appropriate time stamps to indicate when the geolocation measurements 156A-156N were made. First through third geolocation measurements 156A-156N define an actual route taken by the item 140 during transit.

At least three geolocation measurements 156A-156N are made, however, while geolocation measurements 156A-156N are described as being made only three times during transit, additional geolocation measurements e.g., 156N may be made and recorded along with their subsequent time-stamps without departing from the disclosure. The geolocation measurements 156A-156N may be made periodically based on a predetermined schedule such as, but not limited to, every minute, every ten minutes, every hour, once per day, or any other schedule. More or less geolocation data 134 may be collected without departing from the present disclosure.

The geolocation data 134 may be obtained from one or more geolocation sensors 148 that are part of or mounted on the item 140. Alternatively, or additionally, the geolocation sensors 148 may be part of or mounted on packaging the item 140 is being transported within. The geolocation sensors 148 may take the form of global navigation satellite system (GNSS) receivers and may use any type of GNSS system such as GPS, GLONASS, BeiDOU, Galileo, etc. Alternatively, or additionally, the geolocation sensors 148 may utilizes cellular or Wi-Fi signals to perform geolocation. In yet another alternative, the geolocation sensors 148 may use inertial sensors or other systems for determine location and movement of the item 140 and the disclosure is not limited to those geolocation sensors described above.

Once the geolocation data 134 is received from the item 140, the method proceeds to operation 310. In operation 310, the geolocation data 134 received in operation 305, is analyzed by the processor 110 performing the analyzing operation 112. The processor 110 analyzes the geolocation data 134 to detect when at least one of a first through third geolocation measurements 156A-156N is different from an expected measurement for the same time period retrieved from the memory 120. The expectant measurement is stored in the expected transit data 126. The geolocation measurements e.g., 156N that are different then the corresponding expected transit data 126 is indicated as an anomaly. Alternatively, one or more geolocation measurements 156A-156N in the geolocation data 134 may be indicated as an anomaly when it is outside of a predetermined range of the expected transit data 126.

The expected measurements stored in the expected transit data 126 are determined based on the time stamp stored in each of the geolocation measurements e.g., 156A-156N making up the geolocation data 134. The expected measurements in the expected transit data 126 may be determined based on data provided from the courier service transporting the item 140. Alternatively, or additional the expected transit data 126 may be determined by the processor 110 or another device using public data such as, but not limited to mapping software, or data provided by a user or administrator or even as determined by a machine learning model of the transit path.

In operation 315, the processor 110 performing the analyzing operation 112 determines, in response to detecting the at least one anomaly in operation 310, the distance between where the item 140 was geolocated and where it was expected to be geolocated in a corresponding period of time. This distance is then compared with a predetermined threshold. The predetermined threshold may be a specific distance such as, but not limited to, 10 m, 100 m, 1 km or any other distance. The threshold may be specific to the path, time, and location as well. For example, in a crowded city, during rush hour, the predetermined threshold distance may be greater than on a highway at midnight. The predetermined threshold may be determined by a user 172, administrator, developer, or other concerned party and/or may be automatically determined based on the expected path an item 140 is expected to traverse. Alternatively, or additionally, the predetermined threshold may be determined using machine learning or any other tool that may automatically sets a predetermined threshold based on the expected path, and/or other criteria.

Once the difference is determined in operation 315, the method proceeds to operation 320 where each anomaly is compared with the predetermined threshold, if the distance for any anomaly is greater than the predetermined threshold then the method proceeds to operation 340, otherwise it proceeds to operation 325.

At operation 325 the processor 110, analyzes the geolocation data 134 using a trained machine learning algorithm 124. Operation 325 may be performed prior to operation 320 or may be performed instead of operations 315 and 320. Alternatively, operation 325 may not be performed and the method may then proceed straight to operation 335.

The machine learning algorithms 124 may take many forms including naïve bayes, linear regression, decision trees, and neural network algorithm such as a feedforward neural network, autoencoder, probabilistic neural network (PNN), convolutional neural network (CNN), or other known machine learning algorithms 124. The specific type of machine learning algorithm 124 stored in the memory 120 and used by the processor 110 may be selected based on a variety of factors, including computational ability of the processor 110, speed of the machine learning algorithm 124, availably of sufficient training data for the specific machine learning algorithm 124, and appropriateness to the specific ambient sensor data 132 and/or geolocation data 134 (depending on the embodiment being implemented). The machine learning algorithm 124 may be trained based on feedback from the user 172 or other users/administrators, as well as each time a new item 140 is analyzed using the analyzing operation 112.

The geolocation data 134 is analyzed by the processor 110 performing the analyzing operation 112 using the machine learning algorithm 124. The processor 110 determines if the geolocation data 134 as whole or as a part indicates possible tampering based on previously detected patterns in training data or previous performances of the analyzing operation 112 by the processor 110. Specifically, the processor 110 using the machine learning algorithm 124 may compare the actual route taken by the item 140 and compare it to an expected route indicated in the expected transit data 126. The machine learning algorithm 124 may use other methods to analyze the geolocation data 134 without departing from the disclosure. The results of the analyzing operation 112 using the machine learning algorithm 124 are also used to retrain the machine learning algorithm 124 to make it better at detecting potential tampering.

Once the processor 110 performing the analyzing operation 112 using the machine learning algorithm 124 analyzes the geolocation data 134 in operation 325 the method proceeds to operation 330 where the processor 110 determines if the machine learning algorithm indicates tampering. If both operations 320 and 330 are yes (meaning that tampering was not detected) the method proceeds to operation 335 where the item is activated. In operation 335 the processor 110 performing the notifying operation 114, sends an action notification 136 to the user device 160 indicating that an activation signal 138 may be sent to the item 140. After this or alternatively where the item is already activated, the method ends.

Returning to operation 320 or operation 330, if the difference is greater than the predetermined threshold and/or the trained machine learning algorithm indicates tampering the method proceeds to operation 340. In operation 340, the processor 110 performs the notifying operation 114, and sends an action notification 136 indicating that the item 140 may be de-activated and has been tampered with. When the user device 160 receives this action notification 136 signal it is caused to display on a graphical user interface (GUI) 166 that the item has been tampered with. The method in operation 345 has the GUI 166 provide the user 172 a selectable option to request a preplacement item. If the user choses to request a replacement item in operation 350 the method proceeds to operation 360, and the processor 110 or other pertinent device causes a replacement item 140 to be sent.

Once the user either indicates a request for a replacement item in operation 230 and a replacement item is sent, or the user does not request a replacement item in operation 350 the method proceeds to operation 355. Alternatively, where the user device 160 does not include a GUI 166, the method may proceed from operations 320 and 330 to operation 355.

In operation 355, the item is the deactivated. This may be by sending an activation signal from the user device 160 to the item 140 that indicates that the item 140 should be disabled or deactivated. Once the item 140 receives the activation signal 138 indicating it should be deactivated, the item 140 is then disabled. If the item arrives deactivated, operation 260 may be omitted, and the method ends. Alternatively, the processor 110 will cause the item 140 to no longer worked by blocking it on the network 130 or from interacting with the processor 110 or another related networked device (not shown). Once either operation 335 or operation 355 is performed the method 300 of FIG. 3 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 140(f) as it exists on the date of filing hereof unless the words "means for" or "operation for" are explicitly used in the particular claim.

The invention claimed is:

1. A system for detecting tampering of an item during transit from a source to a destination, the system comprising:
   a memory configured to store:
      ambient sensor data associated with the item;
      a first expected measurement associated with the item at a first predetermined timestamp during the transit;
      a second expected measurement associated with the item at a second predetermined timestamp during the transit; and
      a third expected measurement associated with the item at a third predetermined timestamp during the transit; and
   a processor operably coupled to the memory and configured to:
      receive from the item, ambient sensor data, wherein the ambient sensor data comprises:
         a first measurement of an environment surrounding the item at the first timestamp;
         a second measurement of the environment surrounding the item at the second timestamp; and
         a third measurement of the environment surrounding the item at the third timestamp;
         wherein the first measurement, the second measurement, and the third measurement measure at least one of an amount of light in the environment surrounding the item or an amount of sound in the environment surrounding the item;
      detect at least one anomaly in the ambient sensor data, wherein the at least one anomaly occurs when the first measurement is different from the first expected measurement at the first predetermined timestamp, the second measurement is different from the second expected measurement at the second predetermined timestamp, or the third measurement is different from the third expected measurement at the third predetermined timestamp;
      in response to detecting the at least one anomaly, determine a degree of difference between any of the first measurement and the first expected measurement, the second measurement and the second expected measurement, and the third measurement and the third expected measurement; and
      perform an action to disable the item when the determined degree of difference is greater than a predetermined threshold indicating that the item has been tampered in transit from the source to the destination.

2. The system of claim 1, further comprising wherein the processor performs a second action to activate the item when the determined degree of difference is less than the predetermined threshold.

3. The system of claim 1, wherein the action further comprises sending, to a device associated with a user, a notification indicating that the item has been tampered in transit from the source to the destination.

4. The system of claim 3, wherein the device associated with the user includes a graphical user interface, and the notification causes the graphical user interface to display an indication that the item has been tampered in transit from the source to the destination and to provide the user with a selectable option to request a replacement item.

5. The system of claim 1, wherein the processor is further configured to use a trained machine learning algorithm to analyze the ambient sensor data to determine when the ambient sensor data indicates that the item has been tampered in transit from the source to the destination, and when the processor determines that the item has been tampered in transit from the source to the destination the processor performs the action to disable the item.

6. The system of claim 1, wherein the ambient sensor data further comprises: a plurality of additional measurements of the environment surrounding the item at subsequent timestamps and wherein the plurality of additional measurements are made periodically based on a predetermined schedule.

7. The system of claim 1, wherein the ambient sensor data is periodically received by the processor from the item using a wireless network.

8. A method for detecting tampering of an item during transit, comprising:
   receiving from the item, ambient sensor data, wherein the ambient sensor data comprises:
      a first measurement of an environment surrounding the item at a first predetermined timestamp during the transit;
      a second measurement of the environment surrounding the item at a second predetermined timestamp during the transit; and
      a third measurement of the environment surrounding the item at a third predetermined timestamp during the transit;

wherein the first measurement, the second measurement, and the third measurement measure at least one of an amount of light in the environment surrounding the item or an amount of sound in the environment surrounding the item;

retrieving from a memory:
    a first expected measurement associated with the item at the first predetermined timestamp;
    a second expected measurement associated with the item at the second predetermined timestamp; and
    a third expected measurement associated with the item at the third predetermined timestamp;

detecting at least one anomaly in the ambient sensor data, wherein the at least one anomaly occurs when the first measurement is different from the first expected measurement at the first predetermined timestamp, the second measurement is different from the second expected measurement at the second predetermined timestamp, or the third measurement is different from the third expected measurement at the third predetermined timestamp;

in response to detecting the at least one anomaly, determining a degree of difference between any of the first measurement and the first expected measurement, the second measurement and the second expected measurement, and the third measurement and the third expected measurement; and performing an action to disable the item when the determined degree of difference is greater than a predetermined threshold indicating that the item has been tampered in transit from a source to a destination.

9. The method of claim 8, further comprising performing a second action to activate the item when the determined degree of difference is less than the predetermined threshold.

10. The method of claim 8, wherein the action comprises sending, to a device associated with a user, a notification indicating that the item has been tampered in transit from the source to the destination.

11. The method of claim 8, further comprising causing a replacement item to be sent to a user.

12. The method of claim 8, further comprising using a trained machine learning algorithm to analyze the ambient sensor data to determine when the ambient sensor data indicates that the item has been tamper in transit from the source to the destination, and when the trained machine learning algorithm determines that the item has been tampered in transit from the source to the destination, performing the action to disable the item.

13. The method of claim 8, wherein the ambient sensor data further comprises: a plurality of additional measurements of the environment surrounding the item at subsequent timestamps and wherein the plurality of additional measurements are made periodically based on a predetermined schedule.

14. A non-transitory computer-readable medium storing instructions that when executed by a processor cause the processor to:
    receive from an item, ambient sensor data, wherein the ambient sensor data comprises:
        a first measurement of an environment surrounding the item during a transit at a first predetermined timestamp;
        a second measurement of the environment surrounding the item during the transit at a second predetermined timestamp; and a third measurement of the environment surrounding the item during the transit at a third predetermined timestamp;

wherein the first measurement, the second measurement, and the third measurement measure at least one of an amount of light in the environment surrounding the item or an amount of sound in the environment surrounding the item;

retrieve from a memory:
    a first expected measurement associated with the item at the first predetermined timestamp;
    a second expected measurement associated with the item at the second predetermined timestamp; and
    a third expected measurement associated with the item at the third predetermined timestamp;

detect at least one anomaly in the ambient sensor data, wherein the at least one anomaly occurs when the first measurement is different from the first expected measurement at the first predetermined timestamp, the second measurement is different from the second expected measurement at the second predetermined timestamp, or the third measurement is different from the third expected measurement at the third predetermined timestamp;

in response to detecting the at least one anomaly, determine a degree of difference between any of the first measurement and the first expected measurement, the second measurement and the second expected measurement, and the third measurement and the third expected measurement; and perform an action to disable the item when the determined degree of difference is greater than a predetermined threshold indicating that the item has been tampered in transit from a source to a destination.

15. The non-transitory computer-readable medium of claim 14, wherein the instructions further cause the processor to perform a second action to activate the item when the determined degree of difference is less than the predetermined threshold.

16. The non-transitory computer-readable medium of claim 14, wherein the instructions further cause the processor to send, to a device associated with a user, a notification indicating that the item has been tampered in transit from the source to the destination.

17. The non-transitory computer-readable medium of claim 14, wherein the instructions further cause the processor to order a replacement item to be sent to a user.

18. The non-transitory computer-readable medium of claim 14, wherein the instructions further cause the processor to use a trained machine learning algorithm to analyze the ambient sensor data to determine when the ambient sensor data indicates that the item has been tampered in transit from the source to the destination, and when the processor determines that the item has been tampered in transit from the source to the destination, the instructions further cause the processor to perform the action to disable the item.

19. The non-transitory computer-readable medium of claim 14, wherein the ambient sensor data further comprises: a plurality of additional measurements of the environment surrounding the item at subsequent timestamps and wherein the plurality of additional measurements are made periodically based on a predetermined schedule.

20. The non-transitory computer-readable medium of claim 14, wherein the instructions further cause the processor to periodically receive the ambient sensor data from the item using a wireless network.

\* \* \* \* \*